United States Patent

Coffer

[11] 4,053,253
[45] Oct. 11, 1977

[54] POWER GENERATING APPARATUS

[76] Inventor: Carl E. Coffer, 140 W. Hopkins, Pontiac, Mich. 48055

[21] Appl. No.: 595,584

[22] Filed: July 14, 1975

[51] Int. Cl.² ............ F03B 9/00; F03B 13/00; F01D 23/00
[52] U.S. Cl. .................... 415/5; 415/8; 416/8; 417/534; 290/54
[58] Field of Search ............ 415/5, 7, 8; 416/7, 416/8; 417/334, 337, 61, 362; 60/501, 502, 506, 398; 290/43, 54

[56] References Cited

U.S. PATENT DOCUMENTS

| 510,270 | 12/1893 | Kirk et al. | 415/5 |
| 703,355 | 6/1902 | Walter | 415/5 |
| 979,320 | 12/1910 | McKague et al. | 415/5 |
| 2,161,215 | 6/1939 | Wise | 415/5 |
| 3,730,643 | 5/1973 | Davison | 415/5 |
| 3,882,320 | 5/1975 | Schmeller | 290/43 |
| 3,922,012 | 11/1975 | Herz | 415/7 |
| 3,927,330 | 12/1975 | Skorupinski | 290/54 |

FOREIGN PATENT DOCUMENTS

| 60,178 | 1911 | Switzerland | 416/7 |
| 313,850 | 10/1945 | Switzerland | 290/43 |

Primary Examiner—C. J. Husar
Attorney, Agent, or Firm—Walter Potoroka, Sr.

[57] ABSTRACT

A power generating apparatus, the construction and size of which may vary from a relatively small domestic version for individual homes to a larger commercial version for power stations, comprises a device to be anchored in and driven by a substantially horizontally flowing water stream and includes a body having an endless chain horizontally mounted on sprocket wheels fixed on spaced, vertical, rotatable shafts, the chain being continuously driven by water flow driving a plurality of paddles attached thereto and arranged to be pivotable between a vertical position to be propelled downstream by water flow through a chute and a substantially horizontal position for low-drag movement upstream back to the chute inlet, track and roller support means for the paddle assemblies and a drag bar for raising and lowering the paddles from vertical to horizontal and back then to vertical position.

15 Claims, 9 Drawing Figures

U.S. Patent  Oct. 11, 1977  Sheet 1 of 2  4,053,253
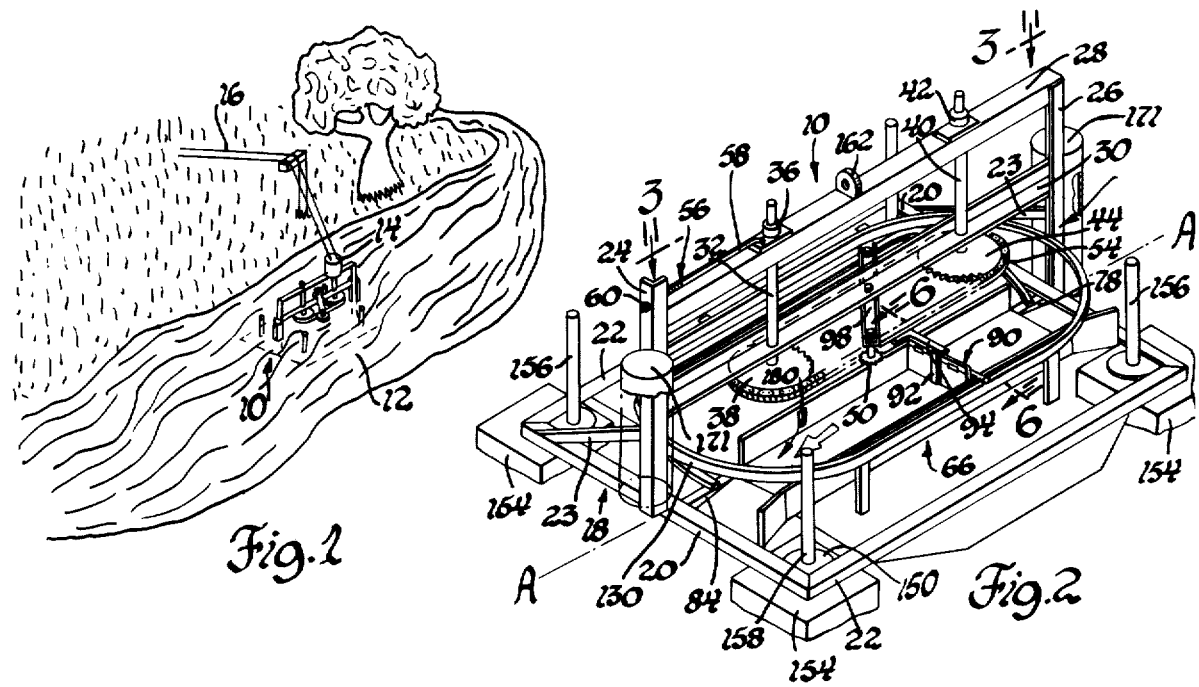
Fig. 1
Fig. 2
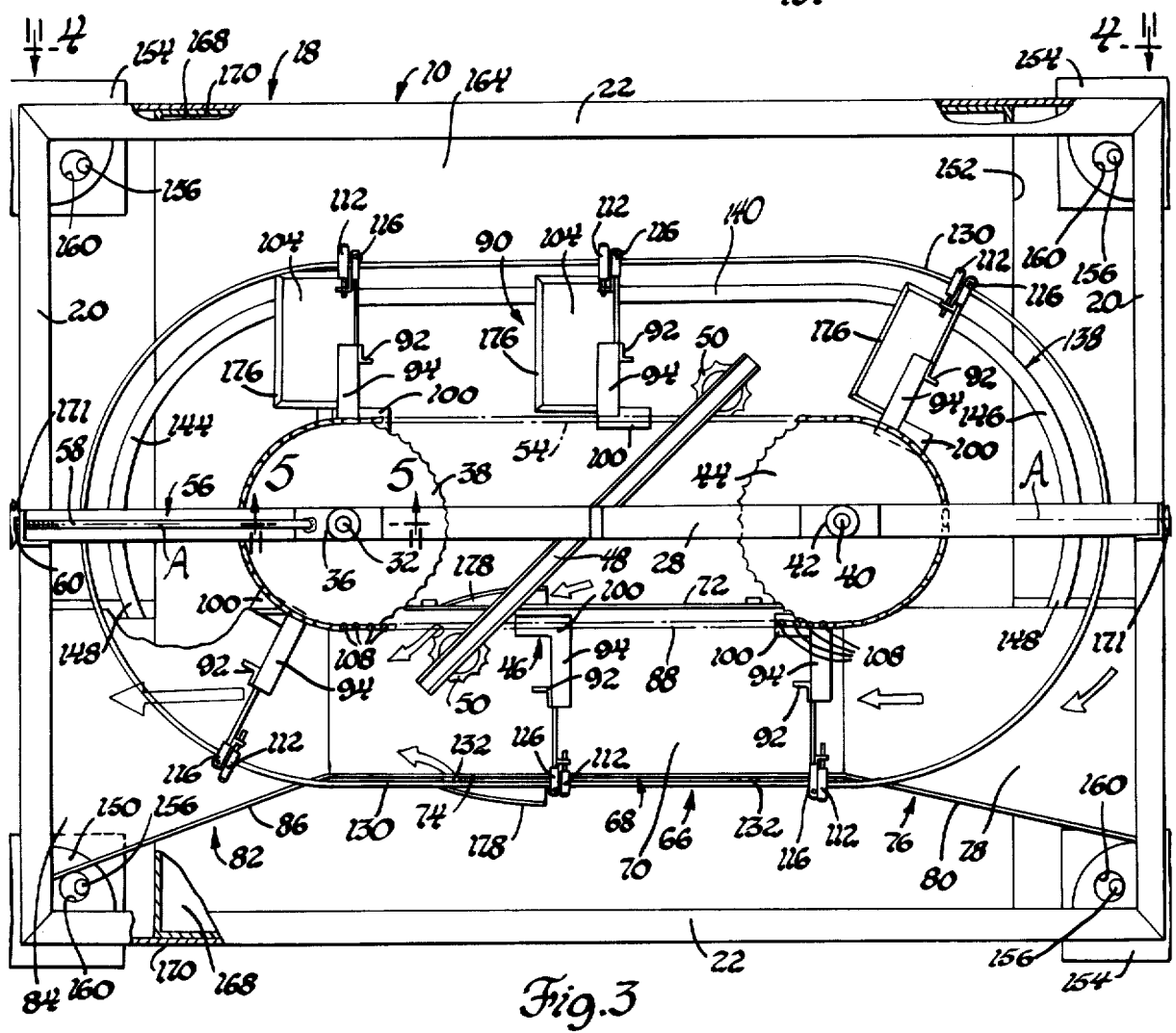
Fig. 3

POWER GENERATING APPARATUS

BRIEF SUMMARY OF THE INVENTION

This invention relates to power generating apparatus, and more particularly to such apparatus adapted to be driven by the force of substantially horizontal flow of water, such as in relatively small fast-flowing streams, as opposed to devices used to generate power in association with a water head provided by a dam.

Devices driven by natural water flow for generating power are well known, ranging from fixed or floating water wheels mounted for rotation on a horizontal axis, for operation either due to the head of water stored behind a dam or the flow of water in a stream, to large turbine installations associated with hugh dams providing a substantial water head.

Also, gasoline or other engine-driven mechanical power generators are known.

More recently, factors such as an energy crisis, increasing costs of energy and power due to inflation, the ability and desire of people to escape to remote areas away from available power to either live, retire or vacation, the need to reduce air and/or water pollution, and the resistance to construction of dams on scenic waterways, etc., have created a revival of the need for a device than can be driven by the readily available water flow in streams to generate mechanical or electrical power.

Accordingly, a main object of the invention is to provide a device adapted to employ the energy of flowing water to do useful work, without the need for gasoline or other fuel.

Another object of the invention is to provide such a device, the structure of which is readily adapted to a device ranging from a relatively small domestic version, such as might be employed to provide electric power for a private cottage located near a fast-flowing trout stream, to a large commercial version, such as could be employed by a utility company to generate power.

Still another object of the invention is to provide such a device that, in either its domestic or commercial versions, is relatively simple and inexpensive to manufacture, assemble and maintain.

A still further object of the invention is to provide such a device comprising a horizontal, sprocket-mounted endless chain to which a plurality of paddles are attached, each paddle being pivotable about a horizontal axis between a rigid or stopped vertical position to be driven downstream by substantially horizontal water flow and a substantially, low-drag horizontal position for return upstream and subsequent driving downstream.

Another object of the invention is to provide such a device having a water chute, including a converging entrance inlet, a straight intermediate portion and a diverging discharging outlet, the chute being disposed entirely on one side of a centerline of the device that is parallel to the water flow, the arrangement and operation of the paddles being such that the paddles, when in the vertical position, are driven downstream through the chute.

A more detailed object of the invention is to provide such a device wherein each paddle is provided, at the end opposite the end secured to the chain, with a support roller assembly and a cooperating roller track having a periphery parallel to and surrounding that of the chain.

Another more detailed object of the invention is to provide such a device wherein the end of each paddle opposite the chain is provided with a pair of rollers, one roller being on a vertical pivot, and the other roller being on a horizontal pivot.

Another object of the invention is to provide such a device wherein a paddle drag bar extends peripherally between the chain and the roller track, approximately from the line parallel to the inner wall of the chute, the ends of the bar being at a level below the bottom edge of a paddle when in its vertical position and sloping gradually upwardly to the intermediate portion thereof which is substantially the length of the intermediate portion of the water chute and at a level near the level of the top hinged edge of the paddle.

Another object of the invention is to provide such a device wherein the paddles are formed with wiping seals engaging the intermediate chute portion.

A still further object of the invention is to provide such a device having means for raising and lowering the same with the stream level. Other objects and advantages will become apparent.

BRIEF DESCRIPTION OF THE SEVERAL VIEWS OF THE DRAWINGS

FIG. 1 is a perspective view illustrating use of a device embodying the invention, particularly a domestic version thereof as might be anchored in a trout stream.

FIG. 2 is an enlarged skeleton perspective view (with certain portions not shown to simplify the view) of the device shown in FIG. 1.

FIG. 3 is a further enlarged top plan view of the device shown by FIG. 2, with portions thereof cutaway and/or in cross-section to better illustrate the structure thereof, looking in the direction of arrows 3 of FIG. 2.

DETAILED DESCRIPTION

Figure 4:
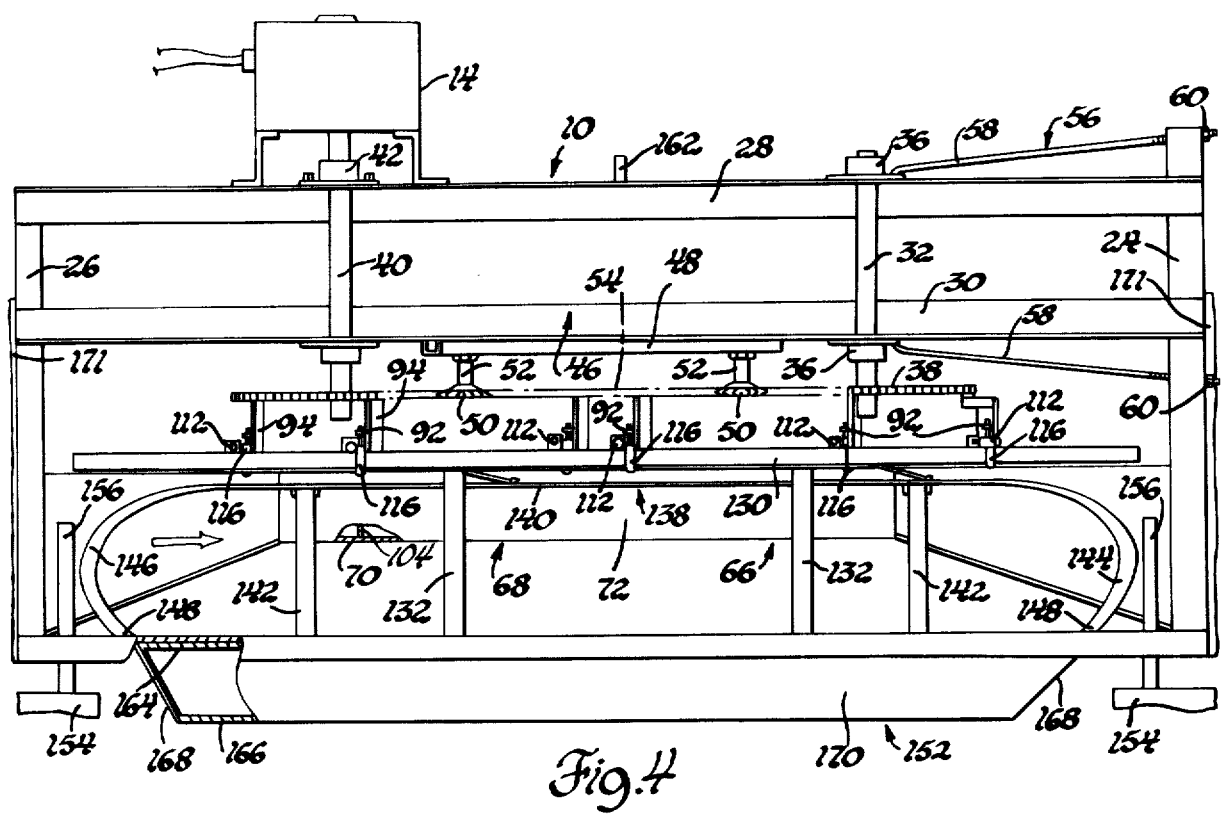
FIG. 4 is a side elevational view of the device shown by FIG. 2, with portions thereof cut away and in cross-section, as in FIG. 3, looking in the direction of arrows 4 of FIG. 3.

Referring now to the Figures in greater detail, FIG. 1 illustrates a domestic version (as already stated, the device is adapted to be constructed in a commercial form for use by utility companies) of a device 10 embodying the invention, as it might be anchored in the bed of a trout stream 12 by a private owner of a cottage at a location remote from a commercial power supply, or for a reserve power supply. In FIG. 1, electricity produced by the generator 14 driven by the device 10 is transmitted by lines 16. Throughout the drawings, the heavy arrows indicate the direction of water flow.

FIGS. 2-7 illustrate a simplified embodiment that includes the principle features of the invention, it being understood, of course, that the specific structure may be modified as desired to adapt the same to available production materials, designs and techniques.

As shown, the device 10 comprises a three-dimensional body including a generally rectangular angle iron or other bottom frame 18 having main end and side members 20 and 22, respectively. The frame 18 and other portions of the device 10 are shown as being of a welded structural steel construction; however, it could be of bolted construction, and/or it could be molded or otherwise constructed from some other material, such as one of the available structural plastic materials. Brace members 23 may be provided.

In FIG. 2, line A—A is the longitudinal centerline of the frame. Main vertical support members 24 and 26 extend upwardly from the ends of the frame 18, approximately where the centerline A—A intersects the end members 20. Upper and lower main horizontal support members, 28 and 30, respectively, extend between the vertical supports 24 and 26, on the centerline A—A.

An idler shaft 32 is mounted vertically through openings 34 formed in horizontal support members 28 and 30 and in frictionless bearings 36 (preferably sealed) bolted on the horizontal support members. A sprocket wheel 38 is secured to the bottom end of shaft 32, disposed at a level (vertical position) below the lower horizontal support 30. Of course, well-known means (not shown) may be provided to prevent the shaft 32 from shifting vertically.

A power output shaft 40 is similarly mounted in bearings 42, and a sprocket wheel 44 is mounted at the bottom end of the shaft 40, at the same level as sprocket wheel 38.

An idler bar assembly 46 comprises a bar 48 bolted or otherwise (preferably adjustably) secured to the lower horizontal support 30, and smaller sprocket wheels 50 are rotatably mounted on pivot shafts 52 secured to the ends of the bar 48, each in a position adjacent one of the main sprocket wheels 38 and 44, respectively, and in the same plane (level) as the wheels 38 and 44. The bar 48 is adjusted to prevent the chain 54 from jumping off the sprockets.

The tension of chain 54 and proper vertical positioning of shaft 32 is adjusted and maintained by a pair of adjustable means 56, each comprising an elongated member 58 secured at one end by threaded means, such as nut 60, to the vertical main support 24 and at the other end to a bearing 36. The openings in the support members 28 and 30 for the shaft 32 and the bolts 62 securing the bearings 36 are formed as elongated slots 34 and 64, respectively, enabling adjustment of the shaft and bearings. Idler bar assembly 46 may also provide a degree of chain tension, although that is not its primary purpose.

A water flow chute 66 is provided on only one side of the centerline A—A, both the centerline A—A and chute 66 being aligned, in use of the device 10, parallel to the water flow. The chute 66 comprises an intermediate portion 68, with a bottom 70 and parallel inner and outer sides 72 and 74, respectively, an inlet 76 with convergent bottom 78 and side 80 and an outlet 82 with divergent bottom 84 and side 86. The chute 66 is essentially a channel with an open top for a purpose to be described, with the intermediate inner side 72 of the chute being disposed laterally between the centerline A—A and the portion 88 of the chain. The chute inlet 76 and outlet 82 have no inner sides (or only short inner sides), for a reason to be explained.

The chute 66 is supported on the frame 18, as by welding the bottom portions 78 and 84 to the end frame members 20 and the vertical members 132 and 133 secured to the chute wall 74 and bottom 70, respectively.

Figure 6:
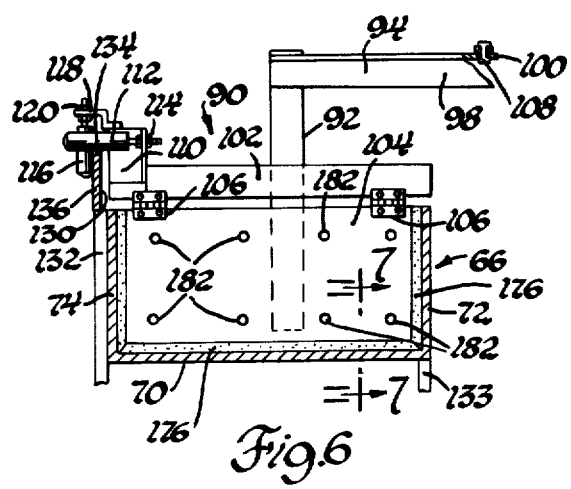
FIG. 6 is an enlarged cross-sectional view taken on the plane of line 6—6 of FIG. 2, looking in the direction of the arrows.
Figure 5:
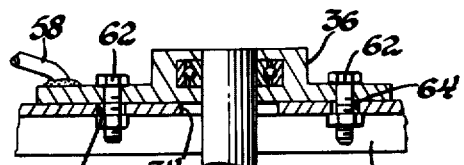
FIG. 5 is an enlarged cross-sectional view taken on the plane of line 5—5 of FIG. 3, looking in the direction of the arrows.

One of the main features of the invention is the paddle structure, one paddle assembly being shown in greater detail in FIG. 6. Preferably, there are six equally-spaced paddle assemblies 90 secured to the chain 54, so that when there are two paddle assemblies in the chute 66, there is one paddle at each end of the device 10, (one paddle entering the inlet 76 and one leaving the exit 82) and two paddles on the side of the centerline A—A opposite the chute.

Each paddle assembly 90 may comprise a vertical member 92, a first horizontal member 94 secured at one end 96 to top of the vertical member 92, the other free end 98 of member having a lateral portion 100, for a purpose to be described. A second horizontal member 102 is secured intermediate its ends to an intermediate position on the vertical member 92. A substantially rectangular paddle 104, having height and length dimensions only slightly less than the cross-sectional height and width dimensions of the intermediate portion 68 of the chute 66 so that the same may pass with clearance through the chute, is secured to the second horizontal member 102, by means of hinges 106. Thus, the paddle 104 is pivotable, from a vertical position against the lower portion of vertical member 102 as a stop, as shown in FIG. 6, to a substantially horizontal position nearly normal to the vertical member 102, as shown in FIG. 4. As shown in FIGS. 3 and 4, the lateral portion 100 on the inner end of horizontal member 94 of each paddle assembly 90 is secured to the chain, at the underside thereof, by means of two adjacent chain link pins 108 passing through portion 100.

For purposes of lending perspective to the description only, it is contemplated that a device intended for domestic use may have chute dimensions, at the intermediate portion thereof, as small as on the order of 7-8 inches wide, 4 inches deep and 26 inches long. In that event, the length and height of the paddles would be somewhat less than 7-8 inches and 4 inches, respectively, to provide clearance for passage of the paddles through the chute. In that event, the chain 54 and sprockets 38 and 44 would be on the order of dimension of a bicycle chain and sprocket, for example. It would be preferable, however, that the sprocket wheel teeth be somewhat longer than those of a bicycle sprocket to make it substantially impossible for the chain to jump off the horizontal sprocket, particularly with the assembly 46 properly adjusted.

The edges of the paddles 104 may be turned toward their upstream sides, when in their vertical position, to trap water. Also, sufficient clearance may be provided between the paddle edges and the chute walls only to permit water flow therebetween to act against and drive the downstream paddle in the chute.

It will be noted that the outer end of the lower horizontal member 102 is fitted with a bracket 110, to which a first horizontal roller assembly 112 is secured by bolt and nut means 114. Another second vertical roller assembly 116 is secured to a bracket 118 by bolt means 120. That is, as seen in FIG. 1, the roller 112 is adapted to roll on a horizontal surface, while the roller 116 is adapted for a vertical surface.

Figure 8:
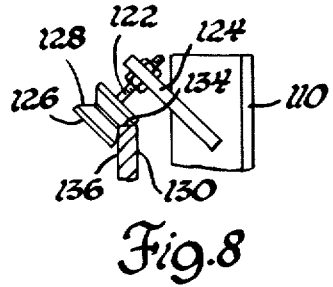
FIG. 8 is a fragmentary portion of FIG. 6 illustrating modification of the invention.

FIG. 8 illustrates a modified roller structure wherein a single pivot 122 is secured to a member 124 attached to bracket 110 so as to be disposed at an angle of 45° to the horizontal. The single roller 126 is formed with a 90° groove 128, providing horizontal and vertical rolling surfaces for the rollers.

The function of the rollers 112 and 116 or 126 is to support the outer ends of the paddle assemblies 90, the inner ends of which are supported by the chain 54, normal to the chute and in a manner so that the paddle assemblies can drive (and move with) the chain.

For the above purpose, the device is provided with a roller track 130 supported on the frame 18 by vertical supports 132, the top edge 134 of the track being disposed horizontally at a level to support the horizontal roller 112. The plan view periphery (FIG. 3) of the track 130 is parallel to that of the chain 54, but spaced outwardly of the chain, along a path that would be traveled by a point near the middle of one of the rollers 112, or near the middle of horizontal surface of roller 126 of FIG. 6. Also, it will be noted (FIG. 3) that the track 130 is positioned so as to be laterally disposed substantially above the outer side wall 74 or the chute intermediate portion 68. The outer vertical surface 136 of the track 130 is engaged by the vertical roller 116, which is provided to keep the paddle assembly 90 from tending to pivot about a vertical axis at its connection to the chain 54, as it could be in the absence of roller 116.

Another main structural feature of the device 10 is a drag bar 138 having an intermediate straight horizontal portion 140 disposed opposite the intermediate portion 68 of the chute 66, at a level only slightly below that of the top hinged edge of the paddle 104, and on the side of centerline A—A opposite the chute. From the horizontal portion 140, which is supported by vertical members 142, the ends 144 and 146 of the drag bar curve parallel to the peripheries of the track 130 and the chain 54 (FIG. 3), but also slope gradually downwardly (FIG. 4). The free ends 148 of the drag bar 138 are secured, as by welding, to members 150, secured between the end members 20 and the adjacent top end of a float tank 152, the structure and purpose of which will be described, so that the free ends 148 are disposed at the level of the frame 18, below the bottoms of the chute inlet and outlet.

The float tank 152 referred to above cooperates with other structure to be described for the purpose of maintaining the device 10 at a proper level in the stream as the stream depth rises and falls, with precipitation and seasonal changes. The ideal level is where the chute and paddles are submerged, but the chain is not submerged.

For example, the device 10 may be supported on the stream bottom by concrete or other support members 154, each having a vertical rod 156 extending upwardly therefrom a distance slightly greater than the expected maximum stream water level. Plates 158 having openings 160 therein to receive the rods 156 may be welded in the inner corners of the angle-iron frame 18. A lifting eye 162 may be secured to the center of the top horizontal support member 28.

The float tank 152 may be a hollow, waterproof, welded-steel or other tank having a flat top 164, a bottom 166 with upwardly-sloped ends 168 and having a width such that the sides 170 may be welded or otherwise secured between the angle iron side members 22. If the buoyant force of the tank 152, when totally submerged, is equal to the weight of the device 10, including the tank, then a relatively small additional buoyant force, such as may be provided by cylindrical floats 171 secured in any desired manner to the vertical support members 24 and 26 would overcome the weight-buoyant force balance and cause device 10 to float. Further, the floats 171, or their equivalent, can be positioned and made of such size and configuration so that the device 10 will float at the desired level, with the chute submerged, but the chain above water.

The sloped end 168 on the upstream end of tank 152 will be acted upon by an upward component of the force of the stream flow to facilitate upward movement of the device 10 on the rods 156 as the stream level rises.

Figure 7:
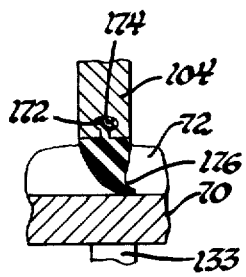
FIG. 7 is a fragmentary cross-sectional view, taken in the plane of line 7—7 of FIG. 6, looking in the direction of the arrows.

Referring now to FIGS. 6 and 7, the edges of the paddles 104 may be formed with a groove 172 to receive the bead 174 of a resilient, low-friction wiping seal 176 to prevent water from flowing through the clearance between the paddle and the walls of the water chute intermediate portion 68. In this modification, the downstream ends of walls 72 and 74 may be formed with external scoops 178 (FIG. 3) to direct flowing water through openings 180 and to paddles positioned in the downstream end of chute portion 68. Additional scoops of variable size and location may be provided, as desired.

As shown in FIGS. 1 and 4, the shaft 40 of the device 10 may be fitted with an electric generator 14, to generate electricity as the shaft 40 is driven. Alternatively, it may be fitted with a gear or other drive element for connection to a cooperating gear or other driven element, which in turn, may be connected to an electric generator or some other useful mechanism to be driven.

OPERATION

With the above description of the structure of device 10, it will be apparent that when the device 10 is anchored in a flowing water stream 12, with the chute 66 immersed in the stream, but the chain 54 and sprockets above water, a paddle 104 positioned near and approaching the inlet 76 will eventually reach an angle, with respect to stream flow, where it will be caught by the flowing water and forced to a vertical position against the vertical member 92 as a stop. In that position, it, and any other paddle already in a vertical position in the chute will be driven downstream through the chute by the force of the moving water acting on the paddles.

The above described action is continuous, because as the paddles in the chute are driven downstream, other paddles leave the chute and are carried upstream by the chain to a position adjacent the upstream inlet 76, where they are again caught by the waterflow, as described above.

It will also be apparent that as a paddle emerges from the outlet 84, the bottom edge thereof eventually engages the drag bar 138. As the chain continues to drive that paddle, it is gradually raised, by the drag bar, to a low-drag, near-horizontal position, as shown in FIG. 4.

Actually, the device could be made to operate with fewer (four, for example) equally-spaced paddle assemblies; in that case, when one paddle is disposed on the centerline at each end of the device, the third paddle is positioned at the center of the chute intermediate portion 68 and the fourth paddle would be directly opposite the third paddle. Due to the low-drag position of the fourth paddle and the decreasing drag of the paddle emerging from the exit, the net forces of the water flow acting on all paddles is to drive the chain. Even only three equally-spaced paddles may be operative, and the invention contemplates such structures. However, it is believed that the device 10 may develop more net power and operate more smoothly, and thus with less wear on the parts, with six paddles, this being akin to the lesser vibration of a six-cylinder internal combustion engine, as compared to a four-cylinder engine.

One advantage of Applicant's apparatus over a horizontally-mounted water wheel, in addition to the fact that it doesn't require a dam and can operate in relatively shallow water, is that the energy is not required to lift moving parts out of the water against gravity.

Figure 9:
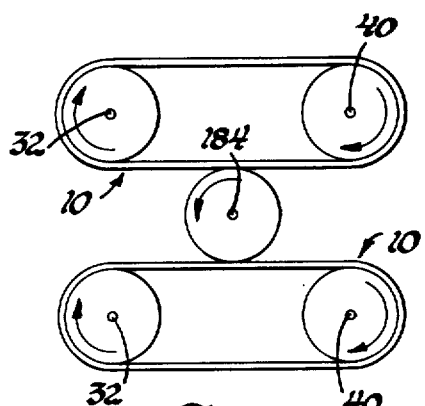
FIG. 9 is a schematic illustration of use of the device shown by FIGS. 2-4 in tandem to double the power output thereof.

As shown in FIG. 9, two devices 10 may be connected in tandem, to double the power in the final output shaft 184.

It will be appreciated that the water level of a small trout stream may vary considerably, as from season to season. For this reason, the device 10 is preferably, although not necessarily, formed with means for automatic raising and lowering the same in the stream, while the device is anchored against horizontal movement in any direction, so as to be always aligned with stream flow. While the means shown is float means comprising the float tank 152 and the floats 171, which may be formed as part of tank 152 and of any desired shape, such as triangular with the vertex pointing upstream to reduce resistance to water flow, more sophisticated means could, of course, be provided.

As shown, the circular shape of floats 171 causes the upstream float to direct water to the chute inlet 78. This function could be enhanced by appropriate design of the upstream float, as conditions may dictate. It will also be noted that the top of tank 152 provides a surface to which supports, such as members 132 and 133, may be secured, as by welding.

Where wiping seals 176 are employed, they may be made of a low friction material, such as Teflon, to reduce paddle drag on the chute and the drag bar. Also, in lieu of the scoops 178, the paddles 104 may be formed with openings 182 (FIG. 6) for the same purpose.

It will be noted that the drag bar 138 not only raises the paddles emerging from outlet 84, but, equally important, it causes the paddles to move to a vertical position in a gradual, controlled manner so that they do not slam against the vertical member stop 92 and cause vibration and wear of the device 10.

It will be apparent from FIGS. 2-4 that inner walls on the chute inlet 78 and outlet 84 are shortened or omitted, depending on the specific design, so that the paddles 104 can enter and emerge from the chute 66 without interference.

While the apparatus 10 is shown and described as fabricated of structural steel and other metal parts, other suitable materials and constructions may be employed within the scope of the invention. For example, the body of the apparatus 10 may comprise a single piece molded plastic frame with integral frame, floats, chute, track, drag bar, etc., with aluminum metal parts, so as to be lightweight and non-corroding.

It is apparent that the invention, as shown and described, provides a device that meets the stated objects, as well as other objects and advantages over the prior art.

While one embodiment, with modifications, of the invention have been disclosed, for purposes of illustration and in such clear and concise language as to enable anyone skilled in the art to practice the same, other embodiments and modifications may be possible, within the scope of the appended claims.

What I claim as my invention:

1. Power generating apparatus, comprising body means adapted to be anchored against downstream or lateral movement in a generally horizontally flowing water stream, said body having a centerline to be aligned generally parallel with the direction of water flow, spaced vertical rotatable shafts mounted on said body approximately on said centerline, said body being formed to provide directing means generally parallel to but horizontally disposed entirely on one side of said centerline for directing water flow through said body, movable means driven by the water flow through said body and including single endless driven and drive means mounted to move in a generally horizontal plane about said shafts, said movable single endless means being arranged so that a portion thereof moves adjacent said water flow directing means and the opposite portion thereof is disposed on the side of said centerline opposite said flow directing means, said movable means further including a plurality of supported paddle assemblies extending horizontally outwardly beyond said endless means and means for changing said paddle positions from a vertical position in said directing means to a substantially horizontal position beyond said directing means.

2. Apparatus such as that recited in claim 1, wherein said body comprises a generally horizontal base frame having end and side members, main vertical support members connected intermediate the ends of said end members and main upper and lower horizontal support members extending between said vertical support members and disposed substantially on or near said centerline, said water flow directing means comprising a chute having a bottom wall, generally vertical side walls and an open top.

3. Apparatus such as that recited in claim 1, wherein said water flow directing means comprises a channel chute having a bottom wall, open top, a converging inlet and a diverging outlet, said chute being disposed on one side of said centerline, said apparatus being free of any water chute structure on the other side of said centerline.

4. Apparatus such as that recited in claim 1, wherein said movable means comprises a sprocket wheel mounted on each of said shafts, said endless drive means being mounted on and having drive connection with said wheels, said plurality of water paddle assemblies including paddles connected to at times drive, and at times to be driven by, said drive means in a manner so that driving paddles pass through said water chute.

5. Apparatus such as that recited in claim 4, wherein said paddles have openings formed therein to allow limited flow of water therethrough.

6. Apparatus such as that recited in claim 4, wherein said chute is also formed with water scoop means to direct water against said paddles.

7. Apparatus such as that recited in claim 1, wherein said movable means comprises a sprocket-mounted horizontal endless member having the inner ends of said paddle assemblies connected thereto and said water flow directing means comprises an open-top channel chute, the outer ends of said paddle assemblies having low-friction support means, said apparatus further including an endless horizontal track for said support means surrounding said endless member and paddle drag raising and lowering means disposed substantially on the side of said centerline opposite said chute, said chute and said drag means being disposed laterally, on their respective sides of said centerline, between said endless member and said track.

8. Apparatus such as that recited in claim 1, additionally comprising means for anchoring the same against downstream and lateral movement and float means separate from said water flow directing means for causing said apparatus to float at a predetermined level in the water, with said paddles submerged.

9. Apparatus such as that recited in claim 8, wherein a portion of said float means diverts water flow to said water flow menas.

10. Apparatus such as that recited in claim 1, wherein said paddle assemblies each comprise a paddle surface to be propelled downstream by water flow, said paddle surface being horizontally hinged rear its top edge so as to be pivotable from a vertical driving position to a substantially horizontal low drag position for return upstream, stop means for said surface when in its driven vertical position and means engaged by the bottom edge of said paddle for lowering the same to said vertical position and raising the same to said substantially horizontal position.

11. Power generating apparatus adapted to be anchored in a horizontal flowing water stream, said apparatus comprising a body having a centerline to be aligned with the stream flow, said body being formed to provide a single horizontal water chute parallel to said centerline and horizontally positioned entirely on one side thereof and plural paddle means mounted at their inner ends on horizontal endless means mounted to rotate in a horizontal plane about spaced vertical axes, said paddle means being driven downstream by the water passing through said chute and said paddle means being returned upstream through the water being positioned on the side of said centerline horizontally opposite said chute, each of said paddle means being pivotable between vertical and horizontal positions about a horizontal axis extending horizontally outwardly beyond said endless means. and endless fixed track support means for the outer ends of said paddle means.

12. A power generating apparatus, comprising a three-dimensional body adapted to be anchored in a flowing water stream, said body including a generally rectangular bottom frame with side and end frame members, a longitudinal centerline between said side members to be aligned generally parallel to the water flow, a main vertical support member extending upwardly from each of said end members on said centerline, upper and lower main horizontal support members extending between said vertical supports, a single horizontally-disposed chute for receiving and discharging water flow, said chute being mounted on said body generally parallel to and entirely on one side of said longitudinal centerline, said body free of any other water chute on the other side of said centerline, said chute being of channel structure with a bottom and inner and outer sides but an open top and having a parallel-side straight intermediate portion and converging inlet and diverging outlet portions connected to the ends of said intermediate portion, water scoop means formed in the downstream end of said intermediate chute portion, spaced vertical shafts each rotatably mounted on said upper and lower horizontal support members, one of said shafts being disposed near but outside said inlet and having a chain sprocket wheel fixed to the lower end thereof below said lower horizontal member, the other of said shafts being disposed near but outside said outlet and having a chain sprocket wheel fixed to the lower end thereof, also below said lower horizontal member, both of said sprockets being at a level above said chute, screw means for adjusting the vertical alignment of one of said shafts with respect to the other of said shafts, means for connecting one of said shafts to a power-utilizing or a power-converting device, an endless chain mounted on said sprocket wheels, an idler bar-sprocket wheel assembly pivotally mounted on said body between said shafts for preventing said chain from jumping off said sprocket wheels, a plurality of substantially equally-spaced water paddle assemblies extending outwardly from said chain, each paddle assembly comprsing a vertical member constructed and operatively arranged to remain always vertical, a first upper horizontal member secured near one end thereof to said vertical member, the other free end of said upper horizontal member being secured to said chain, a second lower horizontal member secured intermediate its ends to an intermediate portion of said vertical member, a generally rectangular paddle having height and length dimensions substantially equal to the cross-sectional depth and width dimensions of said intermediate portion of said chute so as to be passable therethrough and being hinged at its top edge to said lower horizontal member in a manner so said paddle can pivot from a vertical, water-driven position engaging the lower portion of said vertical member as a stop to a substantially horizontal, low-drag position away from said vertical member and a roller assembly, including vertical and horizontal roller surfaces, secured to the outer end of said second lower horizontal member opposite said chain, an endless horizontally-disposed track for said paddle rollers, said track having a periphery parallel to but greater than and surrounding the periphery of said chain, a portion of said track disposed on the chute side of said centerline being positioned generally above and adjacent said outer side wall of said intermediate chute portion, said track having a top surface engaged by said horizontal roller surface and an outer side vertical surface engaged by said vertical roller surface, a paddle drag bar mounted on said body, said drag bar having a straight horizontal intermediate portion on the side of said centerline opposite said intermediate chute portion and being disposed laterally between said chain and said track and at a horizontal level at or only slightly below the level of said hinged tops of said paddles, said drag bar terminating at each end in curved portions joined to each end of said intermediate portion and extending across said centerline approximately to a line parallel with said inner side wall of said chute and to a horizontal level below the bottoms of said chute inlet and outlet, the edges of said paddles being formed to smoothly traverse said drag bar and to tend to trap water when in their vertical chute position, whereby such of said paddles that are vertically positioned in said chute are driven downstream through said chute by water flow to drive said chain, sprockets and shats, said chain driving said other paddles, said drag bar gradually raising paddles that are emerging from said chute through said outlet to a substantially horizontal, low-drag position for upstream movement and gradually lowering such of said paddles that are entering said chute inlet to a vertical position to again be propelled downstream by water flow, and means for anchoring said body against downstream or lateral movement while permitting said body to rise and fall with changing water level, said means comprising at least two openings in said frame for receiving vertical anchoring rods and float means comprising a float tank under said frame having a buoyant force substantially equal to the weight of said apparatus and an additional float for causing said body to float at a desired level in the water.

13. Apparatus such as that recited in claim 11, having means horizontally disposed substantially on the side of said centerline opposite said chute for gradually and successively raising and lowering each of said paddle means as it leaves and enters said chute.

14. Apparatus such as that recited in claim 11, having means for floatably anchoring said body against downstream and lateral movement, whereby said body automatically rises and falls with water level so as to maintain said body submerged to the extent that said chute and paddle means are constantly submerged.

15. Apparatus such as that recited in claim 11, wherein each of said paddle means is formed with a wiping seal with said chute.

* * * * *